(12) United States Patent
Hughes

(10) Patent No.: US 9,001,477 B2
(45) Date of Patent: Apr. 7, 2015

(54) METHOD AND SYSTEM FOR OPEN NEUTRAL PROTECTION CIRCUIT

(71) Applicant: Ronald W. Hughes, Thompson, OH (US)

(72) Inventor: Ronald W. Hughes, Thompson, OH (US)

(73) Assignee: Ericson Manufacturing Co., Willoughby, OH (US)

( * ) Notice: Subject to any disclaimer, the term of this patent is extended or adjusted under 35 U.S.C. 154(b) by 0 days.

(21) Appl. No.: 13/693,169

(22) Filed: Dec. 4, 2012

(65) Prior Publication Data

US 2014/0153145 A1    Jun. 5, 2014

(51) Int. Cl.
*H02H 3/00* (2006.01)
*H02H 11/00* (2006.01)

(52) U.S. Cl.
CPC ..................... *H02H 11/00* (2013.01)

(58) Field of Classification Search
CPC .............................. H02H 3/16; H02H 7/1222

USPC ............................................................ 361/42
See application file for complete search history.

(56) References Cited

U.S. PATENT DOCUMENTS 7,558,034 B2 *    7/2009    Bonasia et al. .................. 361/42
7,889,466 B2 *    2/2011    Chan et al. ...................... 361/45

OTHER PUBLICATIONS

One page drawing, Brett Aqualine, Inc., "Custom Unit for Baja Spas—Units with Serial No. 94185 & Up," dated Jun. 29, 1994.

* cited by examiner

*Primary Examiner* — Thienvu Tran
*Assistant Examiner* — Tien Mai
(74) *Attorney, Agent, or Firm* — Calfee, Halter & Griswold LLP

(57) ABSTRACT

An open neutral protection method and apparatus including a blocking diode arrangement to prevent connection of power in circuits when the power source has an open neutral. In particular, when more than one branch circuits are connected to a power supply with more than one hot power lines, blocking diodes prevent back feed currents from activating relays connecting the power source to the branch circuits when the power source has an open neutral.

18 Claims, 9 Drawing Sheets

METHOD AND SYSTEM FOR OPEN NEUTRAL PROTECTION CIRCUIT

BACKGROUND OF THE INVENTION

Detecting an open neutral condition in the power supply to an electrical circuit can improve the safety of the powered circuit and connected devices. In some cases, open neutral protection may be required by any of a variety of regulating organizations, such as, for example, Underwriters Laboratories (UL) or Canadian Standards Association (CSA).

A common electrical safety option is the use of ground fault circuit interrupters (GFCIs). A GFCI is a fast-acting circuit breaker that can sense small imbalances in the circuit caused by leakage to ground and opens the circuit to disconnect the power supply from the circuit and any connected devices. A GFCI continually monitors the amount of current returning from the protected circuit and any connected devices along the normal electrical path. Whenever the amount of current "returning" differs from the amount "going" by a specified amount, the GFCI interrupts the flow of current—preventing damage and potential electrocution.

GFCIs rely on a properly connected and conducting neutral line to work correctly. For example, if the power side neutral conductor is open or lifted at the supply panel (an "open neutral" condition), the circuitry in the GFCI that senses a ground fault will not have the necessary power from the power supply to operate. In this situation, the GFCI is no longer capable of sensing and disengaging the power in the event of a ground fault. However, the hot line of the power supply may be properly connected and conducting. A user of the circuit will not be protected by the disabled GFCI device and if a faulty device is connected to the unprotected circuit, the user may be exposed to a shock or electrocution hazard.

An open neutral protection device can help ensure proper operation of downstream GFCIs and protect users of these circuits by disconnecting both hot and neutral power supply lines whenever either of these supply lines is disconnected or broken. Certain power distribution equipment may be required to include open neutral protection by, for example, UL standard 943 or UL standard 1640. In addition, for example, the National Electric Code requires open neutral and GFCI protection for lighting and other equipment used in and around swimming pools and spas, and for temporary power being supplied to worksite locations.

SUMMARY

According to an embodiment of the present invention, an open neutral protection circuit includes a first control switch for selectively connecting a power source to a first circuit, wherein the first control switch includes a first element for opening and closing the first control switch, wherein when a first current flows through the first element, the first control switch connects the power source to the first circuit, and a first blocking diode to prevent a second current from flowing through the first element, wherein the first element is connected to the first blocking diode.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

DESCRIPTION

Figure 1:
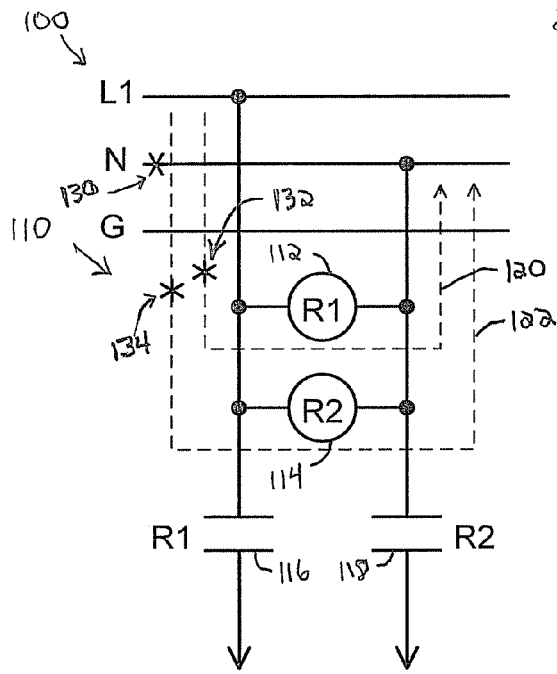
FIG. 1 is a simplified circuit diagram of an exemplary open neutral protection circuit and one branch circuit.

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or another programmed logic device. A circuit may also be fully embodied as software. Additionally, a circuit may include a sensor, detector, emitter/detector combination, and/or any other individual electronic or electric devices or components. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more delineated elements or method steps.

"Device," as used herein, includes any machine or component that achieves or performs an intended function or result. A device may be a stand-alone device or a part of or comprise other devices. A device may cooperate with other devices. A device may comprise a plurality of components or circuits.

"Logic," which in some cases may be synonymous with "circuit" as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. Additionally, logic may include a sensor, detector, or emitter/detector combination. As used herein, "logic" is considered synonymous with "circuit."

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination or permutation." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combinations of alternatives are not included in the choices associated with the list.

In one exemplary embodiment, referring to FIG. 1, simplified circuit 100 shows exemplary power supply lines connected to an exemplary open neutral protection circuit. A single phase power supply is shown with single phase hot line L1, neutral line N, and ground line G. An open neutral protection circuit 110 is shown with two single pole, single throw (SPST) relays R1, R2. Relay R1 is a normally open relay controlling the connection of hot line L1 to a downstream circuit, which may include, for example, a GFCI. Relay R2 is a normally open relay controlling the connection of neutral line N to the downstream circuit. The energizable coil 112 of relay R1 controls the closing of contact 116 of relay R1. The energizable coil 114 of relay R2 controls the closing of contact 118 of relay R2. Both relay coils 112, 114 are connected between hot line L1 and neutral line N. Although this and other embodiments include relays and coils, other types of controllable switches and elements for switching action may be used.

In operation, when supply lines L1, N are properly connected, current is able to flow from hot line L1, through relay coil 112 of relay R1, and through neutral line N, as shown by current path 120. Similarly, current is able to flow from hot line L1, through relay coil 114 of relay R2, and through neutral line N, as shown by current path 122. When current flows through energizable coils 112, 114, they are energized. When energized, relay coils 112, 114 close normally open contacts 116, 118, connecting hot line L1 and neutral line N, respectively, to the downstream circuit.

However, if the neutral line N is open or not connected, as shown by break 130 (denoted with an "X"), then current is not able to flow through current paths 120, 122, as depicted by breaks 132, 134, respectively. It should be noted that break 130 is the break that prevents current from flowing through current paths 120, 122, and that breaks 132, 134 are depicted only to represent that current cannot flow through paths 120, 122. Since current is not able to flow through current paths 120, 122, relay coils 112, 114 are not energized, and relay contacts 116, 118 are not closed. In this manner, the open neutral protection circuit 110 prevents the connection of hot line L1 and neutral line N to the downstream circuit when the supply neutral line N is open. A similar break in hot line L1 would also prevent current from flowing through current paths 120, 122, and similarly prevent the connection of hot line L1 and neutral line N to the downstream circuit.

Figure 2:
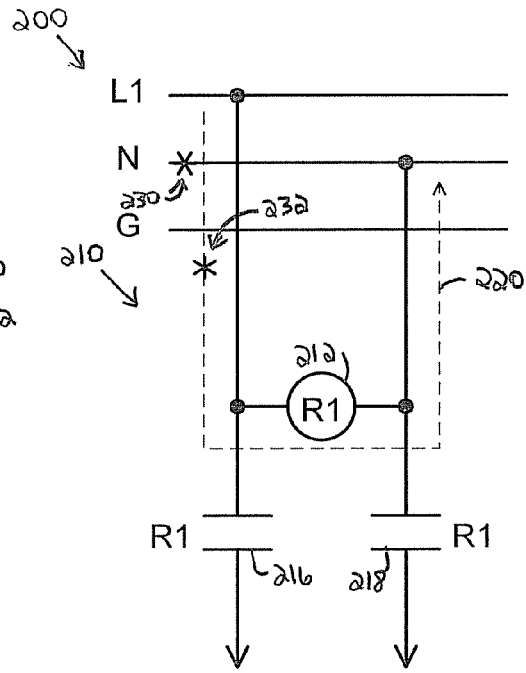
FIG. 2 is a simplified circuit diagram of another exemplary open neutral protection circuit and one branch circuit.

The exemplary simplified circuit 200 shown in FIG. 2 is similar to the exemplary circuit of FIG. 1, except that it utilizes a double pole, single throw (DPST) relay. FIG. 2 demonstrates that many control switch and relay configurations may be used to achieve a circuit with similar logic. An exemplary open neutral protection circuit 210 is shown with one DPST relay R1 instead of the two SPST relays shown in FIG. 1. Relay R1 is a normally open relay controlling both the connection of hot line L1 and neutral line N to a downstream circuit. The energizable coil 212 of relay R1 controls the closing of contacts 216, 218 of relay R1.

In operation, when supply lines L1, N are properly connected, current is able to flow from hot line L1, through relay coil 212 of relay R1, and through neutral line N, as shown by current path 220. When energized, relay coil 212 closes normally open contacts 216, 218, connecting hot line L1 and neutral line N, respectively, to the downstream circuit.

However, if the neutral line N is open or not connected, as shown by break 230, then current is not able to flow through current path 220, as shown by break 232. Since current is not able to flow through current path 220, relay coil 212 is not energized, and relay contacts 216, 218 are not closed. In this manner, the open neutral protection circuit 210 prevents the connection of hot line L1 and neutral line N to the downstream circuit when the supply neutral line N is open. For simplicity, the remaining embodiments will reference DPST relays. It should be understood that other control switch and relay configurations, such as, for example, SPST relays, could also be used for equivalent logic and circuits.

Figure 3:
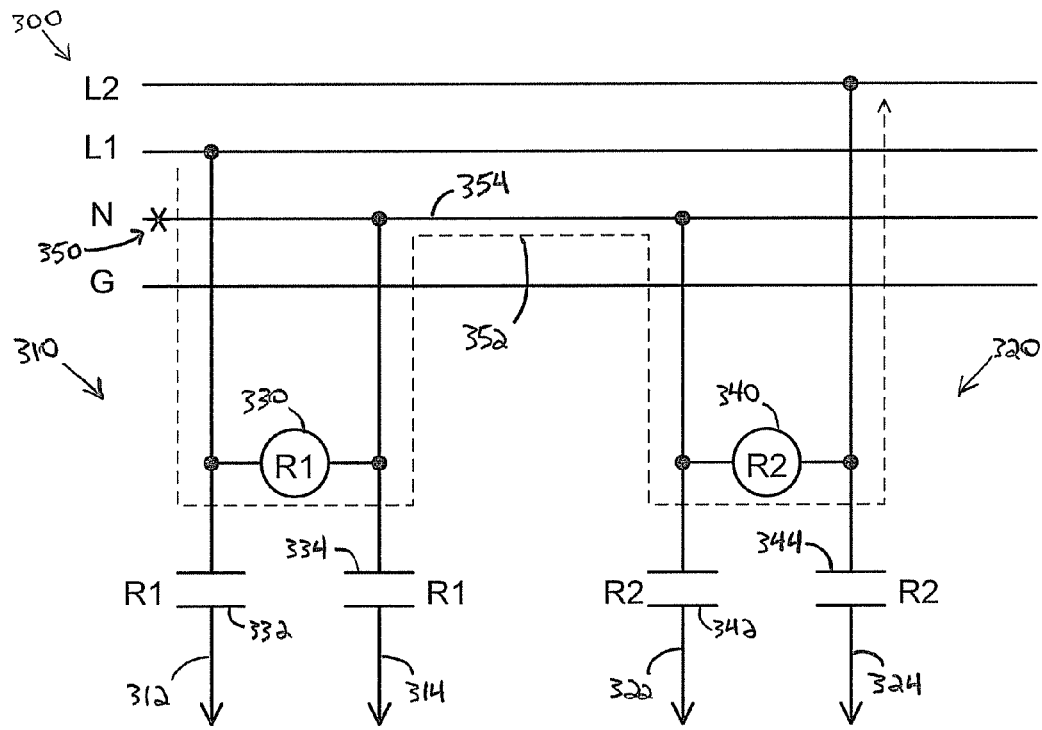
FIG. 3 is a simplified circuit diagram of exemplary open neutral protection circuits and two branch circuits.

The simplified circuit 300 shown in FIG. 3 is similar to the circuit of FIG. 2, except that it includes an exemplary power supply with multiple hot lines and two exemplary open neutral protection circuits, each one feeding a separate downstream branch circuit. Exemplary power supplies include, for example, single phase 120/240V or three phase 120Y208V, among others. A power supply is shown with first hot line L1, second hot line L2, neutral line N, and ground line G. Two open neutral protection circuits 310, 320 are shown. Exemplary open neutral protection circuit 310 feeds a first branch circuit, where line 312 connects hot line L1 with the first branch circuit and line 314 connects neutral line N with the first branch circuit. Similarly, exemplary open neutral protection circuit 320 feeds a second branch circuit, where line 324 connects hot line L2 with the second branch circuit and line 322 connects neutral line N with the second branch circuit.

Open neutral protection circuit 310 includes DPST relay R1. Relay R1 is a normally open relay controlling both the connection of hot line L1 and neutral line N to the first downstream branch circuit via energizable coil 330 and contacts 332, 334 of relay R1. Similarly, open neutral protection circuit 320 includes DPST relay R2. Relay R2 is a normally open relay controlling both the connection of hot line L2 and neutral line N to the second downstream branch circuit via energizable coil 340 and contacts 342, 344 of relay R2.

In operation, when supply lines L1, L2, N are properly connected, current is able to flow from hot line L1, through relay coil 330 of relay R1, and through neutral line N. Also, current is able to flow from hot line L2, through relay coil 340 of relay R2, and through neutral line N. These current paths are not shown in FIG. 3 with dashed lines. As described in detail above, when energized, relay coil 330 closes normally open contacts 332, 334, connecting hot line L1 and neutral line N, respectively, to the first downstream branch circuit.

Similarly, relay coil 340 closes normally open contacts 344, 342, connecting hot line L2 and neutral line N, respectively, to the second downstream branch circuit.

In this situation, with a power supply having multiple hot lines L1, L2 and common neutral line N, if neutral line N is open or not connected, as shown by break 350, then current may still flow through current path 352, as shown by the dashed line. Even though neutral line N is open at the source, the two branch circuits share the common neutral line N where it is continuous at 354. Consequently, current is able to flow between different branch circuits through this portion 354 of neutral line N. In this embodiment, because hot lines L1, L2 of the exemplary power supply oscillate and are out-of-phase with each other, current can flow through current path 352 when the voltage potentials of hot lines L1 and L2 are different, dividing normally across the interconnected relay coils 330, 340. For example, if hot line L1 was at a higher potential than hot line L2, current would flow from hot line L1, through coil 330 of relay R1, through the common neutral line N portion 354, through coil 340 of relay R2, and to hot line L2, as shown by current path 352. This possibility is introduced by circuits that connect to power supplies with multiple hot supply lines and common neutrals.

This back feed condition allows coils 330, 340 of relays R1, R2, respectively, to energize normally, even though neutral line N is open. Consequently, contacts 332, 334 of relay R1 and contacts 342, 344 of R2 are closed, connecting hot line L1 and neutral line N to the first branch circuit via lines 312, 314, respectively, and connecting hot line L2 and neutral line N to the first branch circuit via lines 324, 322, respectively.

This can present a dangerous situation to a user of these branch circuits. For example, if the downstream branch circuits include a GFCI, the GFCI circuitry that senses a ground fault will no longer be capable of sensing the fault and disengaging the power because, although contacts 334 and 342 are closed, neutral line N is open. The GFCI requires a properly connected neutral line N to properly sense ground faults. Although neutral line N is open, hot lines L1, L2 of the power supply are properly connected and conducting, exposing a user of the branch circuit to hot lines L1, L2 without a neutral line N connection and without GFCI protection.

Figure 4:
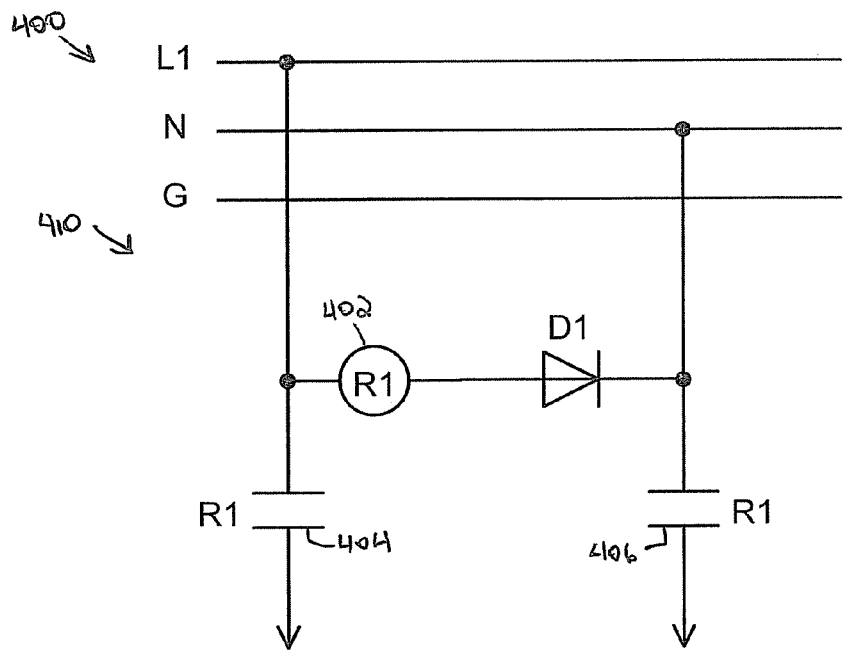
FIG. 4 is a simplified circuit diagram of an exemplary open neutral protection circuit including a blocking diode and one branch circuit.

The exemplary simplified circuit 400 shown in FIG. 4 utilizes a blocking diode D1 in series with a coil 402 of a relay R1 in an exemplary open neutral protection circuit 410. Circuit 400 prevents the back feed issues associated with circuit 300 in FIG. 3. Relay R1 is a DPST relay, where coil 402 closes contacts 404 and 406 when energized. Diode D1 is arranged to allow the normal flow of current from hot line L1 to neutral line N to activate relay R1. In this arrangement, diode D1 also prevents the flow of current from neutral line N to hot line L1. In operation, open neutral protection circuit 410 may be used to prevent activation of relay R1 when there is an open neutral condition or when the supply lines L1, N are cross-wired. As shown in the following embodiments, open neutral protection circuit 410 may also be used to prevent activation of relay R1 when used with a power supply that could introduce a back feed current through a common neutral line N, as described above in relation to FIG. 3.

Figure 5:
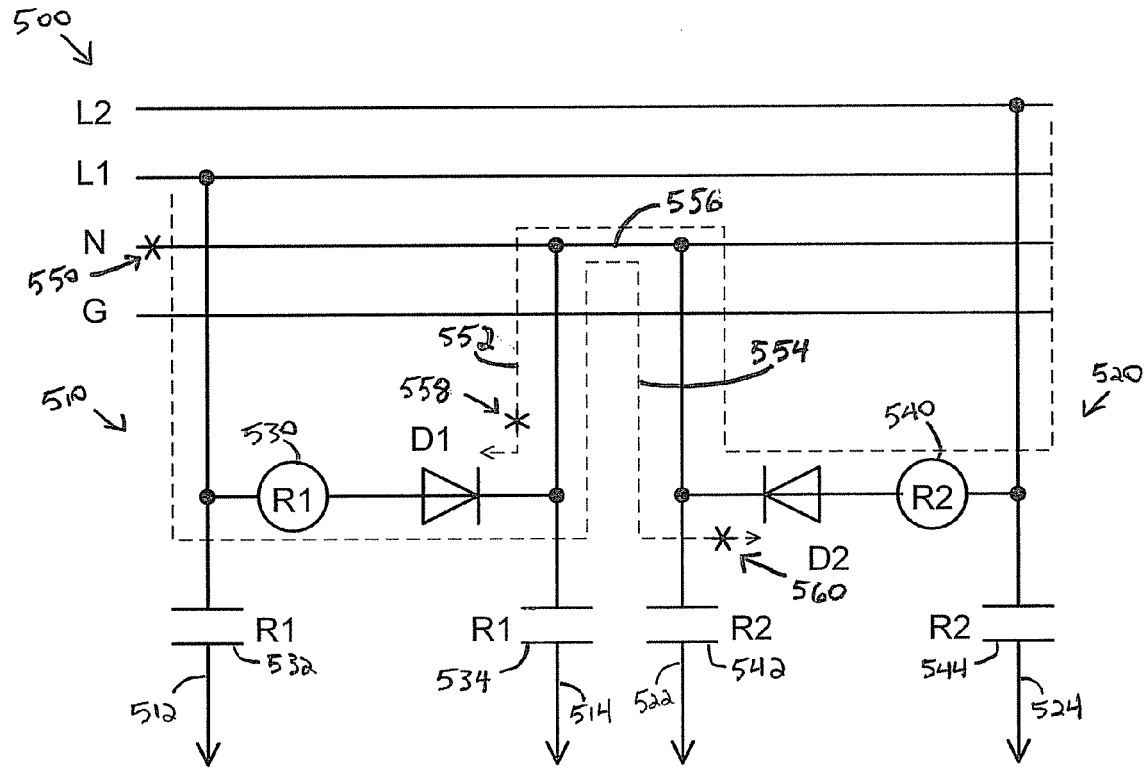
FIG. 5 is a simplified circuit diagram of exemplary open neutral protection circuits including blocking diodes and two branch circuits.

The exemplary simplified circuit 500 shown in the embodiment of FIG. 5 incorporates two exemplary open neutral protection circuits 510, 520 into a circuit with an exemplary power supply having multiple hot lines L1, L2. Open neutral protection circuit 510 feeds a first branch circuit, where line 512 connects hot line L1 with the first branch circuit and line 514 connects neutral line N with the first branch circuit. Similarly, open neutral protection circuit 520 feeds a second branch circuit, where line 524 connects hot line L2 with the second branch circuit and line 522 connects neutral line N with the second branch circuit.

Open neutral protection circuit 510 includes DPST relay R1 in series with blocking diode D1. Relay R1 is a normally open relay controlling both the connection of hot line L1 and neutral line N to the first downstream branch circuit via energizable coil 530 and contacts 532, 534 of relay R1. Similarly, open neutral protection circuit 520 includes DPST relay R2 in series with blocking diode D2. Relay R2 is a normally open relay controlling both the connection of hot line L2 and neutral line N to the second downstream branch circuit via energizable coil 540 and contacts 542, 544 of relay R2.

In operation, when supply lines L1, L2, N are properly connected, current is able to flow from hot line L1, through relay coil 530 of relay R1, through diode D1, and through neutral line N. Also, current is able to flow from hot line L2, through relay coil 540 of relay R2, through diode D2, and through neutral line N. These current paths are not shown in FIG. 5. As described in detail above, when energized, relay coil 530 closes normally open contacts 532, 534, connecting hot line L1 and neutral line N, respectively, to the first downstream branch circuit. Similarly, relay coil 540 closes normally open contacts 542, 544, connecting hot line L2 and neutral line N, respectively, to the second downstream branch circuit.

However, if the neutral line N is open or not connected, as shown by break 550, then current cannot flow through current paths 552, 554 as shown by the dashed lines in FIG. 5. Although the two branch circuits share the common neutral line N where it is continuous at 556, back feed current is prevented in each direction by diodes D1, D2. In particular, diode D1 prevents back feed current flow in hot line L2 from energizing coil 530 of relay R1, as depicted by break 558, and diode D2 prevents back feed current flow in hot line L1 from energizing coil 540 of relay R2, as depicted by break 560. Consequently, current is unable to flow between different branch circuits through portion 556 of neutral line N. In this manner, open neutral protection circuits 510, 520 prevent coils 530, 540 from closing contacts 532, 534, 542, 544 when there is an open neutral condition, which prevents connecting potentially dangerous hot lines L1, L2 to the downstream branch circuits (which may also include GFCI circuits) even in embodiments where the power supply includes multiple hot lines.

Figure 6:
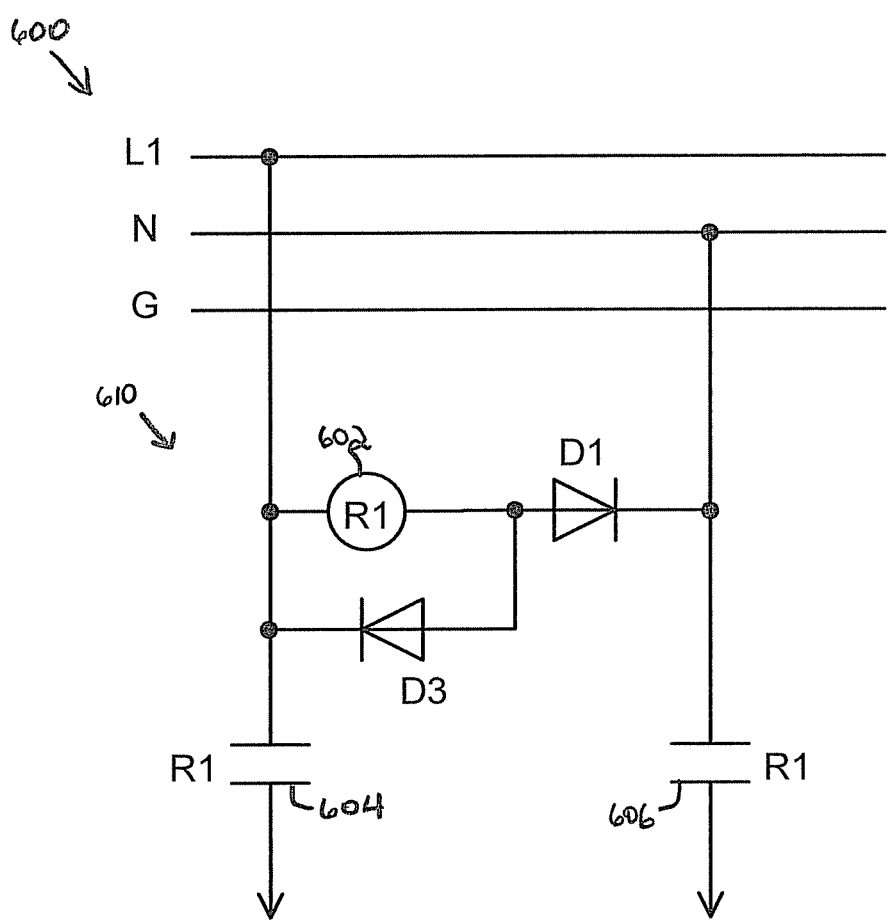
FIG. 6 is a simplified circuit diagram of an exemplary open neutral protection circuit including a blocking diode, a freewheel diode, and one branch circuit.

The exemplary simplified circuit 600 shown in FIG. 6 is similar to the circuit in the embodiment of FIG. 4, except that it utilizes a diode D3 in parallel with a coil 602 of a relay R1 in an exemplary open neutral protection circuit 610. Relay R1 is a DPST relay, where coil 602 closes contacts 604 and 606 when energized. Blocking diode D1 is arranged to allow the normal flow of current from hot line L1 to neutral line N to activate relay R1 and prevents the flow of current from neutral line N to hot line L1. Free-wheel diode D3 is arranged around coil 602 to prevent a "fly-back" condition—a voltage spike across coil 602 when the power supply is removed after the coil 602 is fully energized—that may cause, for example, arcing across an open switch.

Free-wheel diode D3 does not change the open neutral protection logic described above in FIGS. 4-5, but demonstrates that the exemplary simplified open neutral protection circuits described herein may be combined with various other components for purposes unrelated to the logic that provides open neutral protection. Numerous other embodiments with various other configurations of blocking diodes may also be used to achieve the same logical result—blocking back feed current from energizing the coil of a control switch.

Figure 7:
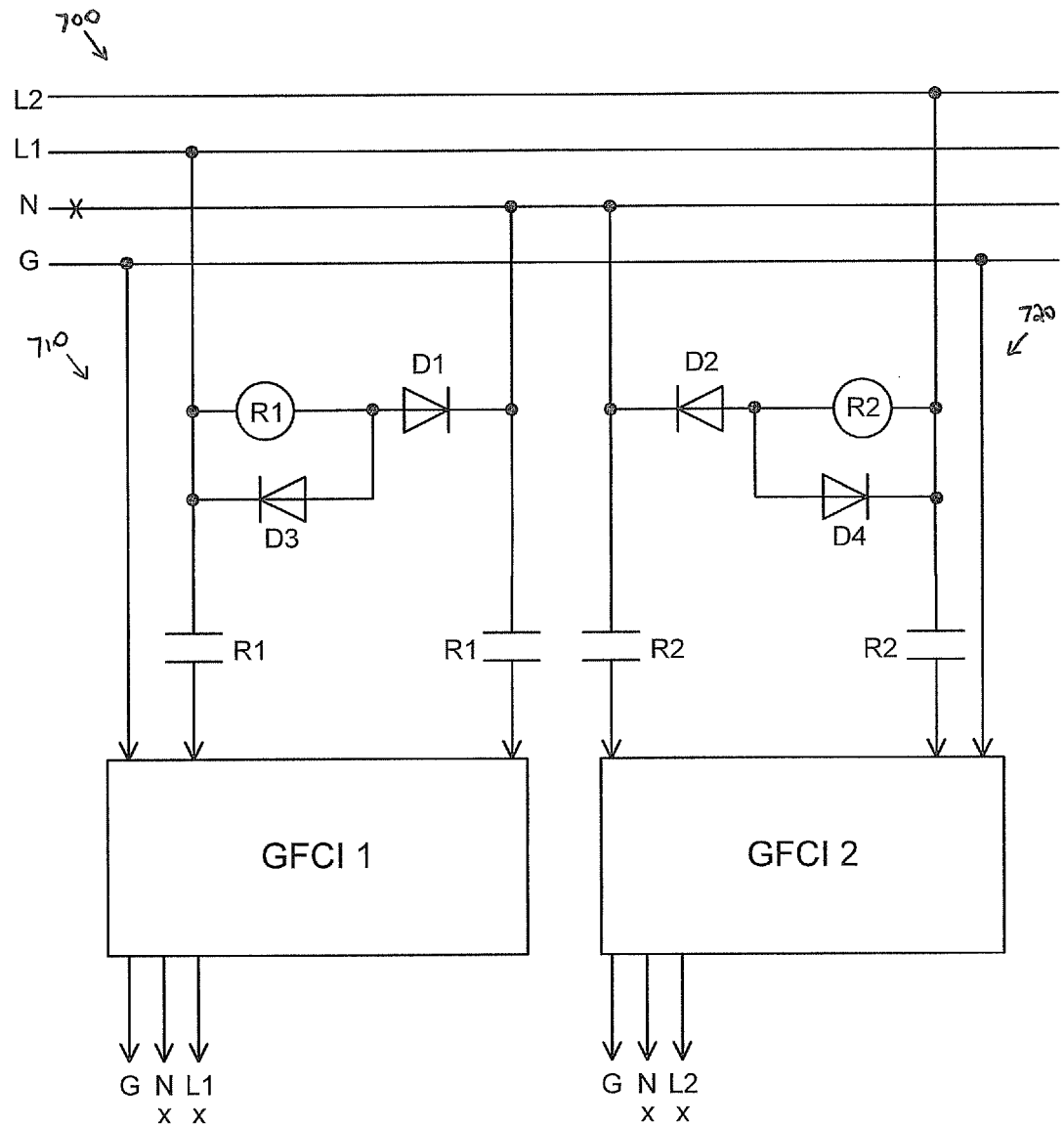
FIG. 7 is a simplified circuit diagram of exemplary open neutral protection circuits including blocking diodes, freewheel diodes, and two branch circuits with GFCIs.

The exemplary simplified circuit 700 shown in FIG. 7 is similar to the circuit in the embodiment of FIG. 5, except that it includes free-wheel diodes D3, D4 in the exemplary open neutral protection circuits 710, 720, respectively, and GFCI devices GFCI 1 and GFCI 2 downstream of the open neutral protection circuits 710, 720. GFCI 1 is arranged to provide a first GFCI protected branch circuit including supply lines L1, N, and G. GFCI 2 is arranged to provide a second GFCI protected branch circuit including supply lines L2, N, and G. The first and second branch circuits share common neutral line N, as described in the embodiments above. In this embodiment, open neutral protection circuit 710 prevents connecting supply lines L1, N to GFCI 1 when there is an open neutral condition. Similarly, open neutral protection circuit 720 prevents connecting supply lines L2, N to GFCI 2 when there is an open neutral condition. Consequently, when there is an open neutral condition, supply lines L1, L2, and N will not be connected to the first and second branch circuits.

As shown in FIGS. 4-7, the exemplary open neutral protection circuits 410, 510, 520, 610, 710, 720 may be introduced between various power supply lines and various downstream circuits to provide open neutral protection. Power supplies include any power supply with at least one hot line and a neutral line, but especially power supplies that include a plurality of hot lines and a common neutral (as shown, e.g., in FIGS. 5 and 7), for example, single phase 120/240V or three phase 120Y208V, among others. Downstream circuits include any circuit that is supplied power from the aforementioned power supplies, including circuits that also include GFCI protection circuits (as shown, e.g., in FIG. 7).

The exemplary open neutral protection circuits 410, 510, 520, 610, 710, 720, shown in FIGS. 4-7, may be embodied as separate components, including, for example, as part of original and retrofit installations. For example, referring to FIG. 5, relays R1, R2 and blocking diodes D1, D2 may be introduced into an original or existing circuit between the power supply lines L1, L2, N and the downstream circuits supplied by lines 512, 514, 522, 524. In particular, for example, as part of a retrofit, existing downstream lines 512, 514, 522, 524 may be disconnected from power supply lines L1, L2, N and components embodying relays R1, R2 and blocking diodes D1, D2 may be connected between power supply lines L1, L2, N and downstream lines 512, 514, 522, 524, resulting in the exemplary circuit 500 shown in the embodiment of FIG. 5. The components embodying relays R1, R2 and blocking diodes D1, D2 may be, for example, stand-alone components or combinations of stand-alone components hard-wired to power supply lines L1, L2, N and downstream lines 512, 514, 522, 524. These components (R1, R2, D1, D2) may be selected for a particular environment or application, and in accordance with any applicable standards or requirements, such as, for example, UL standards. Free-wheel diodes (such as, e.g., D3, D4 shown in FIG. 7) and other additional components (not shown) may also be included for other purposes. For example, another component that may be added to any of the circuits is a visual indicator to show that the relay contacts are closed. In one embodiment, this may be an internal mechanical flag causing the color of a viewing window to change with its position. In another embodiment, a power on indicator provided by a light or LED may be used as a visual indicator. Neither of these exemplary components will add to or alter the open neutral protection function of the circuit, but are examples of additional components (not shown) that may be added to the various circuits in other embodiments.

In this manner, existing circuits, such as, for example, in various power supply installations, panels, equipment, etc., may be retrofitted to provide open neutral protection. These applications include, for example, retrofitting or replacing circuits protected with, for example, open neutral protection circuits 110, 210, 310, 320, shown in FIGS. 1-3. In some cases, for example, where existing open neutral protection circuits include relays, such as, for example, relays R1, R2 of FIGS. 1-3, a retrofit may only require the introduction of blocking diodes, such as, for example, blocking diodes D1, D2 of FIGS. 4 and 5, resulting in the exemplary circuit 500 shown in the embodiment of FIG. 5.

In other embodiments, the exemplary open neutral protection circuits 410, 510, 520, 610, 710, 720, shown in FIGS. 4-7, may be embodied as an open neutral protection device. For example, as shown in the simplified circuit 800 shown in FIG. 8, open neutral protection circuits 810, 820 may be included in exemplary open neutral protection device 1 (ONP 1) and exemplary open neutral protection device 2 (ONP 2), respectively. Exemplary open neutral protection circuits 810, 820 include the same circuitry as open neutral protection circuits 710, 720 shown in FIG. 7, but are embodied as ONP 1 and ONP 2, respectively. ONP 1 and ONP 2 may be any device incorporating open neutral protection circuit 810 or 820, such as, for example, in a semiconductor device. ONP 1 and ONP 2 provide open neutral protection to downstream circuits, including devices GFCI 1 and GFCI 2. Open neutral protection circuits 810, 820 are packaged into ONP 1, ONP 2, respectively, which may also be used in original and retrofit installations, as described above. For example, ONP 1, ONP 2 may include pigtail wiring for connections to hard-wire to power supply lines L1, L2, N and downstream lines, for example, connecting to GFCI 1 and GFCI 2. In other embodiments, ONP 1, ONP 2 may be a device with terminals for connecting to a receptacle connected to power supply lines L1 L2, N and downstream lines, for example, connecting to GFCI 1 and GFCI 2.

Figure 9:
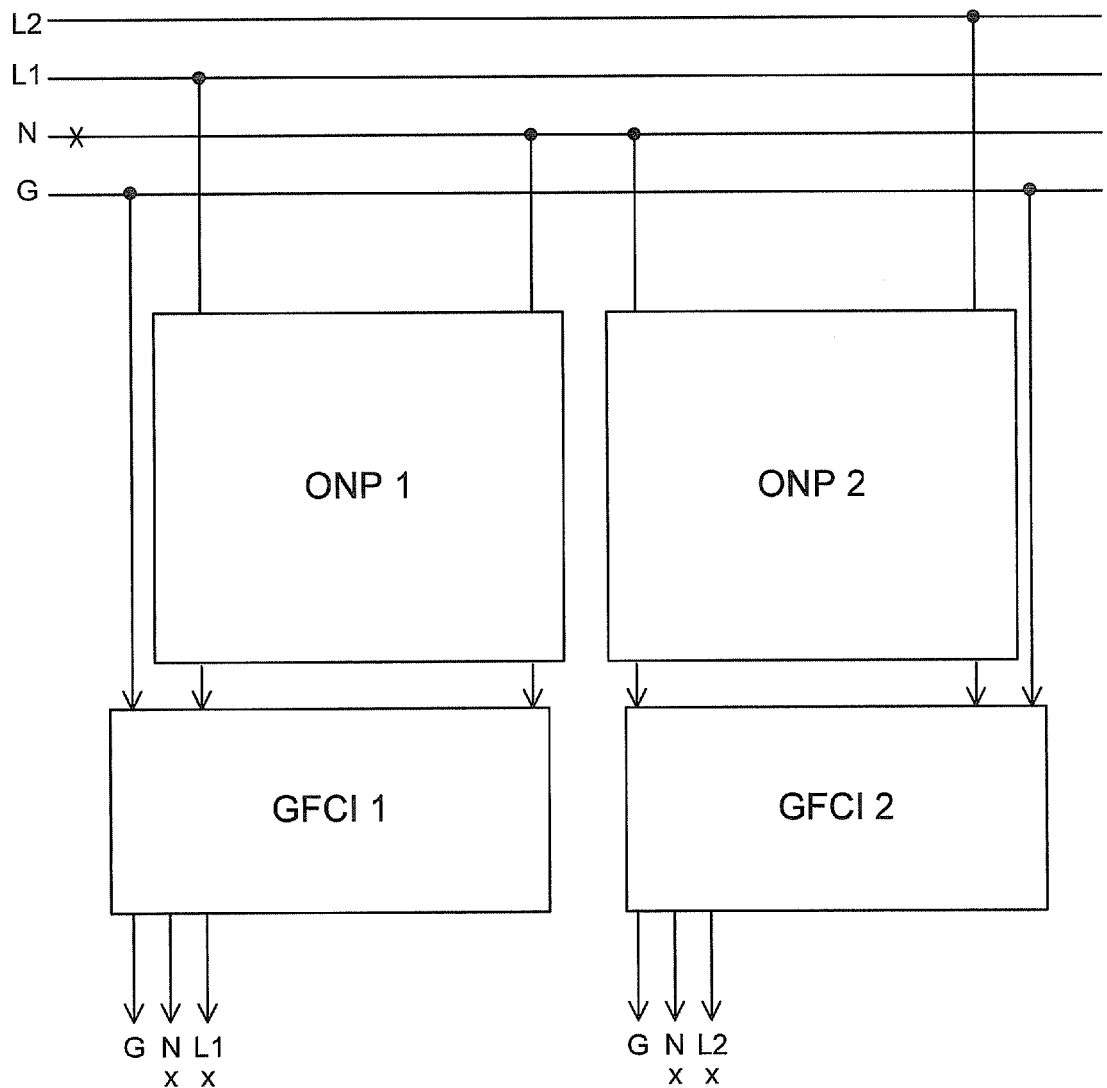
FIG. 9 is a simplified circuit diagram of other exemplary open neutral protection devices and two branch circuits with GFCIs.

ONP 1 and ONP 2, as shown in FIG. 9, may include the exemplary open neutral protection circuits 410, 510, 520, 610, 710, 720, as shown in FIGS. 4-7, but may also include additional components (not shown) for other purposes.

Figure 10:
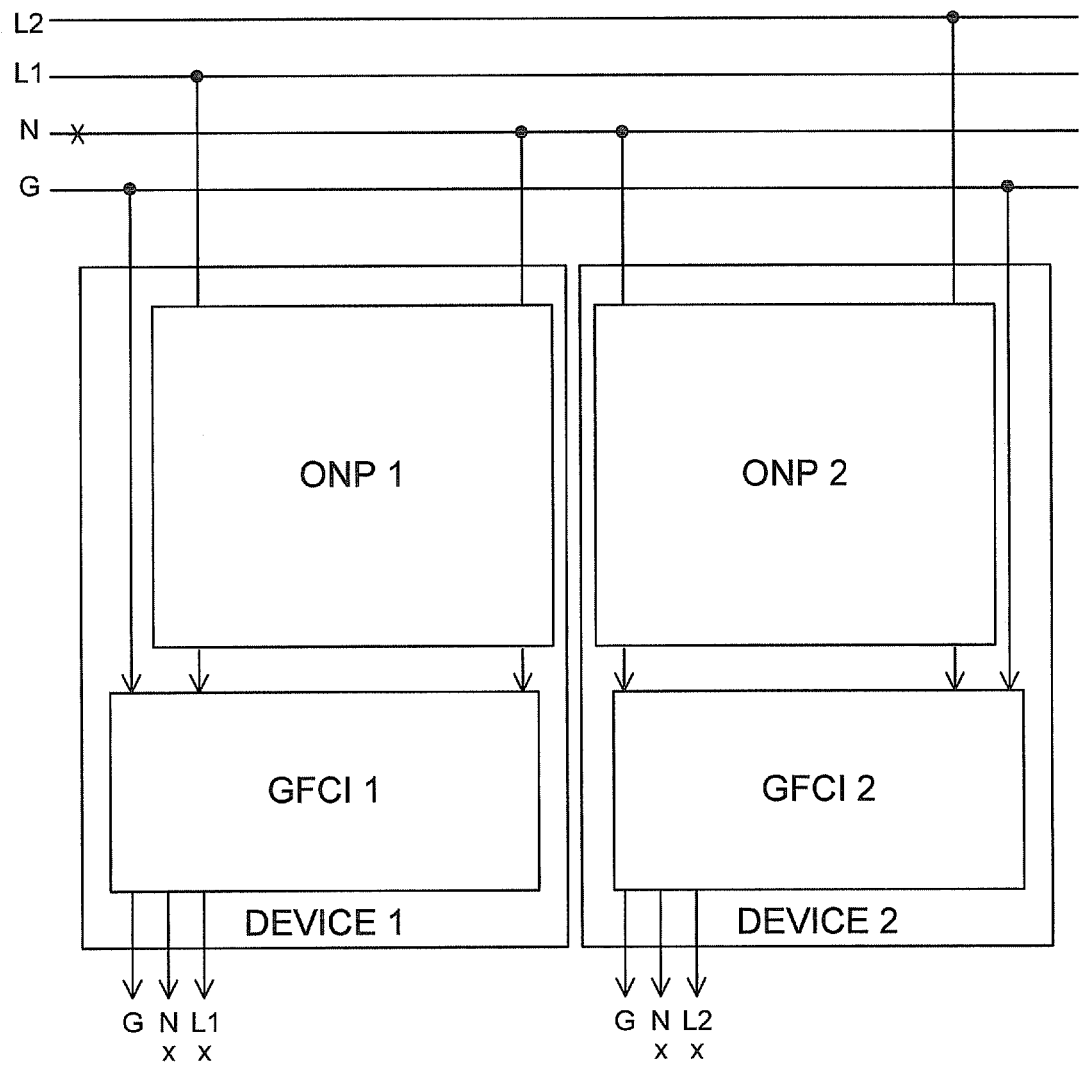
FIG. 10 is a simplified circuit diagram of exemplary devices that include open neutral protection devices and GFCIs.

In other embodiments, an open neutral protection circuit, such as exemplary open neutral protection circuits 410, 510, 520, 610, 710, 720, as shown in FIGS. 4-7, may be included in a device with other devices or having other capabilities. For example, as shown in FIG. 10, exemplary open neutral protection device 1 (ONP 1) and exemplary open neutral protection device 2 (ONP 2) are included in exemplary device 1 and exemplary device 2, respectively, which also include, for example, GFCI 1 and GFCI 2, respectively. Device 1 and device 2 may include other devices and circuitry with other capabilities beyond open neutral protection and GFCI protection. In addition, device 1 and device 2 may be embodied in a package suitable for various installations, such as, for example, with pigtail wiring for hard-wire connections and with terminals for connecting to receptacles.

Figure 8:
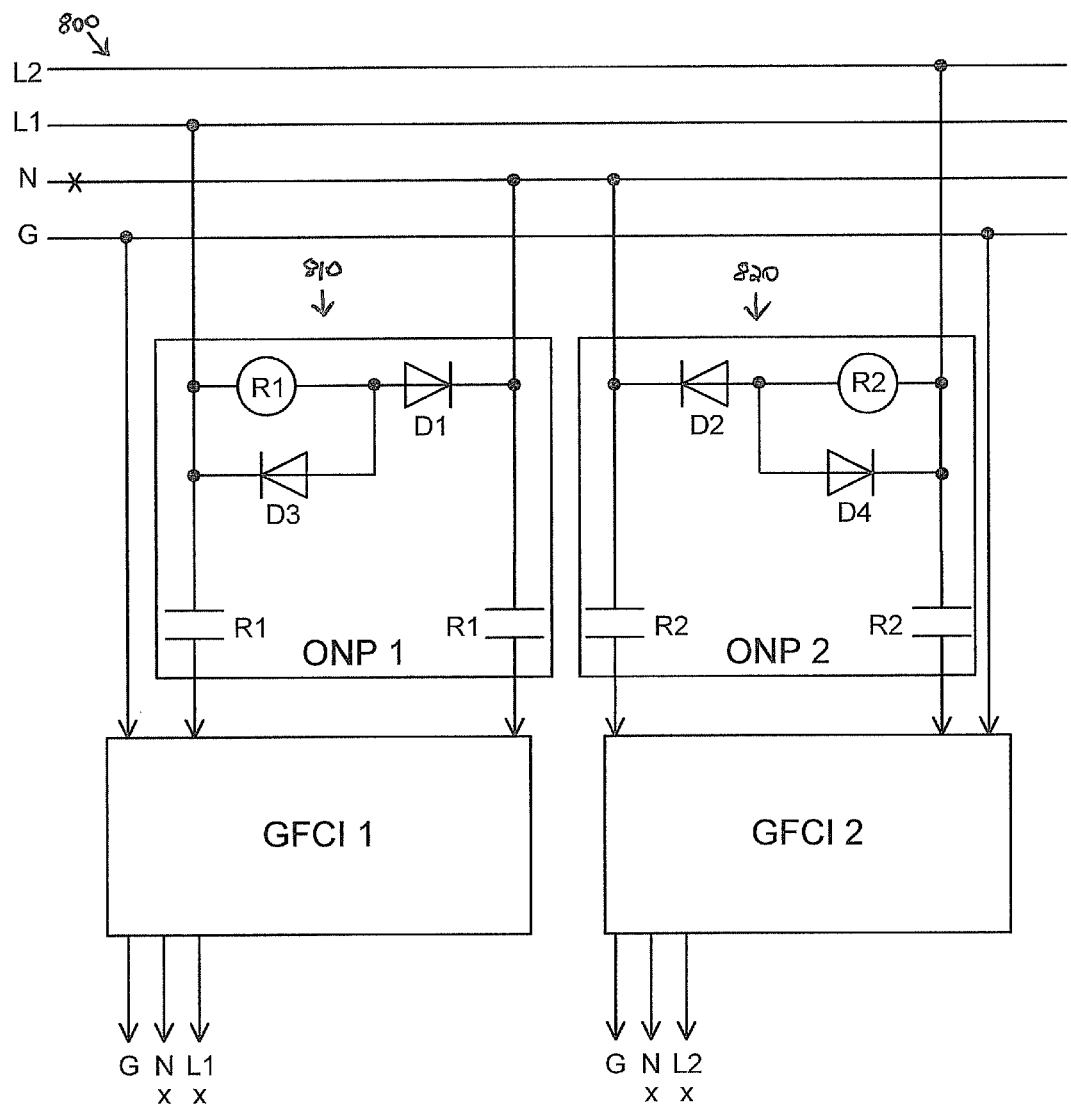
FIG. 8 is a simplified circuit diagram of exemplary open neutral protection devices and two branch circuits with GFCIs.
Figure 11:
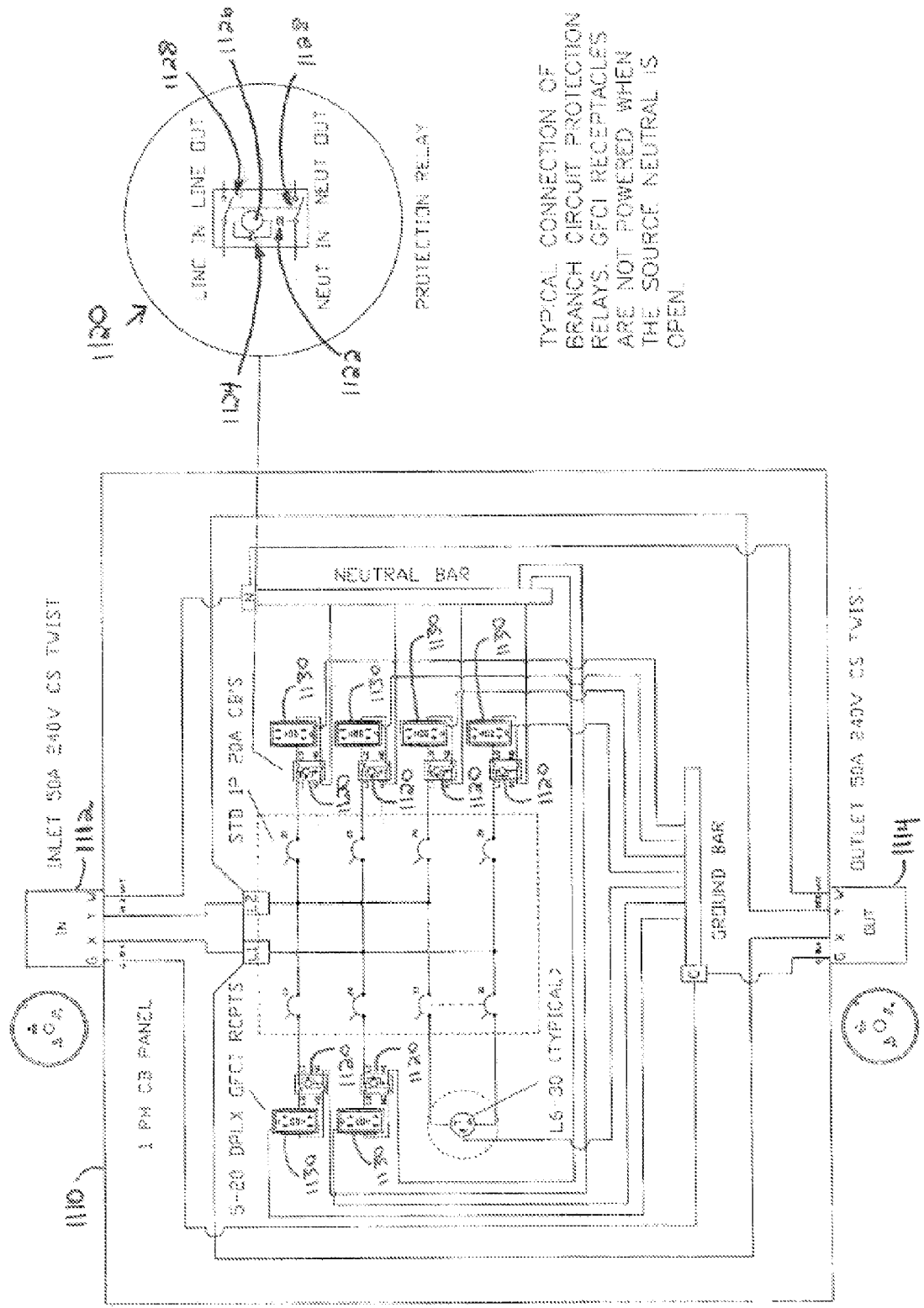
FIG. 11 is an exemplary electrical distribution panel that includes exemplary open neutral protection devices.

FIG. 11 shows an embodiment including an exemplary electrical power distribution panel 1110. Panel 1110 includes a plug/receptacle inlet 1112 with supply lines L1, L2, N, G fed by conductors labeled X, Y, W, G, respectively. Panel 1110 also includes a plug/receptacle outlet 1114 with supply lines L1, L2, N, G feeding conductors labeled X, Y, W, G, respectively. Six exemplary open neutral protection devices 1120 are shown installed in the panel 1110. Six exemplary GFCI devices 1130 are shown installed in the panel 1110. The open neutral protection devices 1120 and GFCI devices 1130 are connected as shown in FIG. 8. In particular, open neutral protection devices 1120 include alternating open neutral protection circuits 810, 820 with relays R1, R2, blocking diodes D1, D2, and free-wheel diodes D3, D4, respectively. FIG. 11 includes an exploded view of an exemplary open neutral protection device 1120, where blocking diode 1122 corresponds to blocking diode D2, free-wheel diode 1124 corresponds to free-wheel diode D3, relay coil 1126 corresponds to relay R2 coil, and relay contacts 1128 correspond to relay R2 contacts.

Figure 12:
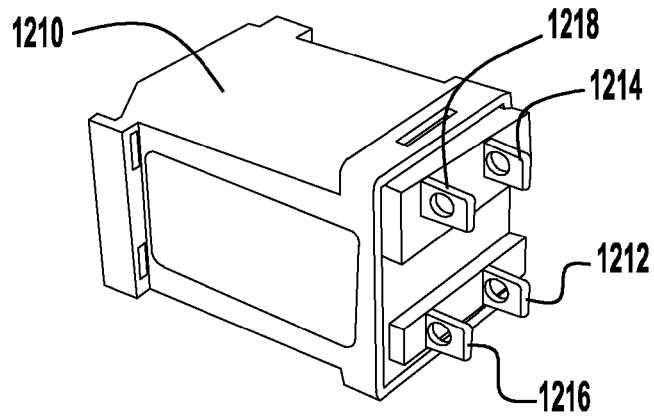
FIGS. 12-14 show views of an exemplary four-pin open neutral protection device.
Figure 13:
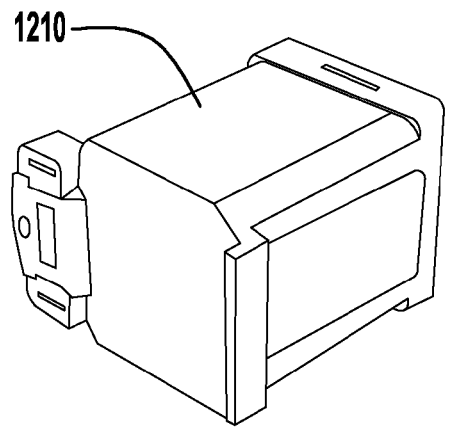
Figure 14:
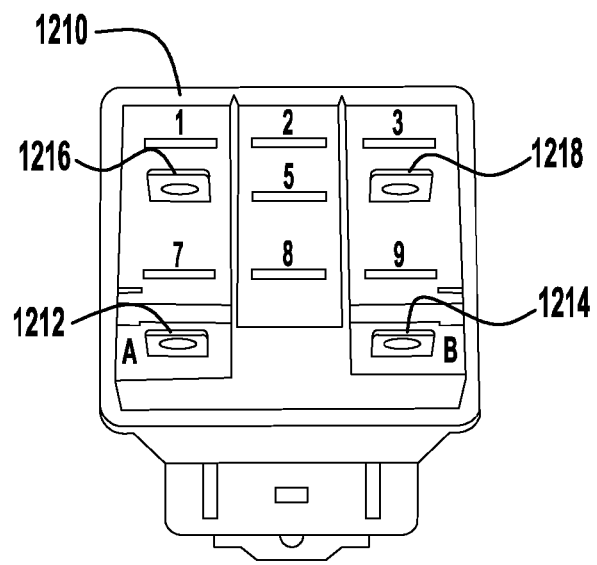

FIGS. 12-14 show an exemplary embodiment including a four-pin device 1210. In this embodiment, device 1210 includes, for example, the components associated with circuit 610 of FIG. 6. In this embodiment, device 1210 employs four terminals associated with an exemplary DPST relay package. In other embodiments, other relay packages and terminal configurations may also be used.

FIG. 12 is a side and bottom view of the exemplary device 1210. FIG. 13 is a side and top view of the exemplary device 1210. FIG. 14 is a bottom view of the exemplary device 1210. Device 1210 uses a din rail mount case with four terminals: two for incoming power from power supply lines, such as, for example, lines L1, L2, N of the various embodiments mentioned above; and two for power delivery to downstream lines, such as, for example, the various downstream lines mentioned in the embodiments above.

As shown in FIGS. 12 and 14, the input power (e.g., L1 or L2 and N) will be connected to pins "A" 1212 and "B" 1214, respectively. The outgoing power will be connected to pins "4" 1216 and "6" 1218, respectively. Because of the internal diodes, correct connection is important so as to provide the covered protection. As discussed in the embodiments above, the circuit (and relay device) connection is polarity sensitive, such that the blocking diodes block current from the N supply line. The relay case or end base may be marked with polarity "dots" to help ensure proper orientation and installation of devices, such as device 1210. In this embodiment, wiring instructions can include directions to connect all incoming power relay "dot" terminals to neutral N. In other embodiments, other techniques, such as, for example, physical interferences may be integrated into devices to prevent incorrect installation. This will ensure that all of the internal blocking diodes point to neutral N and the correct blocking function is provided for the open neutral condition. In addition, outgoing power wiring will also be polarity sensitive due to the neutral N terminal orientation, and the dotted output terminal must be connected to the downstream branch circuit neutral wiring for correct power delivery.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

I claim:

1. An open neutral protection circuit, comprising:
   a first control switch for selectively connecting a power source to a first circuit, wherein the first control switch comprises a first element for opening and closing the first control switch, wherein when a first current flows through the first element, the first control switch connects the power source to the first circuit;
   a first blocking diode configured to prevent a second back feed current from flowing from a neutral line through the first element, wherein the first element is connected to the first blocking diode;
   a second control switch for selectively connecting the power source to a second circuit, wherein the second control switch comprises a second element for opening and closing the second control switch, wherein when a third current flows through the second element, the second control switch connects the power source to the second circuit; and
   a second blocking diode configured to prevent a fourth back feed current from flowing from the neutral line through the second element, wherein the second element is connected to the second blocking diode;
   wherein the first blocking diode and the second blocking diode prevent any current from flowing in either direction through a continuous portion of the neutral line and through the first element and the second element due to an open neutral in a supply side of the power source;
   wherein the first element is arranged to conduct the first current from a first hot line of the power source to the neutral line of the power source, and wherein the second current has a first path from the neutral line to the first hot line through the first element, and wherein the second element is arranged to conduct the third current from a second hot line of the power source to the neutral line of the power source, and wherein the fourth current has a second path from the neutral line to the second hot line through the second element, and wherein the first hot line and the second hot line are out of phase with respect to each other.

2. The open neutral protection circuit of claim 1, wherein the first circuit comprises a first ground fault circuit interrupter (GFCI).

3. The open neutral protection circuit of claim 1, wherein the first control switch is a first relay, the second control switch is a second relay, the first element is a first coil, the second element is a second coil, and wherein the first coil is connected in series with the first blocking diode and the second coil is connected in series with the second blocking diode.

4. The open neutral protection circuit of claim 1, further comprising:
   a first free-wheel diode arranged in parallel with the first element to dissipate energy stored in the first element when source power is removed; and
   a second free-wheel diode arranged in parallel with the second element to dissipate energy stored in the second element when source power is removed.

5. The open neutral protection circuit of claim 1, wherein the first circuit comprises a first ground fault circuit interrupter (GFCI) and the second circuit comprises a second GFCI.

6. A method of providing open neutral circuit protection, comprising:
   selectively connecting a power source to a first circuit with a first control switch comprising a first element, wherein when a first current flows through the first element, the first control switch connects the power source to the first circuit;
   preventing a second back feed current from flowing through the first element with a first blocking diode, wherein the first element is connected to the first blocking diode;
   selectively connecting the power source to a second circuit with a second control switch comprising a second element, wherein when a third current flows through the second element, the second control switch connects the power source to the second circuit; and preventing a fourth back feed current from flowing through the second element with a second blocking diode, wherein the second element is connected to the second blocking diode;

wherein the first blocking diode and the second blocking diode prevent any current from flowing in either direction through a continuous portion of a neutral line and through the first element and the second element due to an open neutral in a supply side of the power source, wherein the first element is arranged to conduct the first current from a first hot line of the power source to the neutral line of the power source, and wherein the second current has a first path from the neutral line to the first hot line through the first element, and wherein the second element is arranged to conduct the third current from a second hot line of the power source to the neutral line of the power source, and wherein the fourth current has a second path from the neutral line to the second hot line through the second element, and wherein the first hot line and the second hot line are out of phase with respect to each other.

7. The method of claim 6, wherein the first circuit comprises a first ground fault circuit interrupter (GFCI).

8. The method of claim 6, wherein the first control switch is a first relay, the second control switch is a second relay, the first element is a first coil, the second element is a second coil, and wherein the first coil is connected in series with the first blocking diode and the second coil is connected in series with the second blocking diode.

9. The method of claim 6, further comprising:
dissipating energy stored in the first element when source power is removed with a first free-wheel diode arranged in parallel with the first element; and
dissipating energy stored in the second element when source power is removed with a second free-wheel diode arranged in parallel with the second element.

10. The method of claim 6, wherein the first circuit comprises a first ground fault circuit interrupter (GFCI) and the second circuit comprises a second GFCI.

11. A method of providing open neutral circuit protection, comprising:
connecting a first blocking diode in series with a first element of a first control switch to prevent a first back feed current from flowing through the first element, wherein the first control switch selectively connects a power source to a first downstream circuit when current flows through the first element; and
connecting a second blocking diode in series with a second element of a second control switch to prevent a second back feed current from flowing through the second element, wherein the second control switch selectively connects the power source to a second downstream circuit when current flows through the second element;
wherein the first blocking diode and the second blocking diode prevent any current from flowing in either direction through a continuous portion of a neutral line and through the first element and the second element due to an open neutral in a supply side of the power source; wherein the first back feed current has a first path from the neutral line to a first hot line of the power source through the first element, and wherein the second back feed current has a second path from the neutral line to a second hot line of the power source through the second element, and wherein the first hot line and the second hot line are out of phase with respect to each other.

12. The method of claim 11, wherein the first downstream circuit comprises a first ground fault circuit interrupter (GFCI).

13. The open neutral protection circuit of claim 11, wherein the first downstream circuit comprises a first ground fault circuit interrupter (GFCI) and the second downstream circuit comprises a second GFCI.

14. The open neutral protection circuit of claim 11, wherein the first element is arranged to conduct current from the first hot line of the power source to the neutral line of the power source, and wherein the first back feed current has the first path from the neutral line to the first hot line through the first element, and wherein the second element is arranged to conduct current from the second hot line of the power source to the neutral line of the power source, and wherein the second back feed current has the second path from the neutral line to the second hot line through the second element.

15. An open neutral protection circuit, comprising:
means for selectively connecting a power source to a first circuit when a first current flows through a first switching means, the first switching means connecting the power source to the first circuit based on the first current;
means for preventing a second back feed current from flowing through the first switching means when a neutral line of the power source is open;
means for selectively connecting the power source to a second circuit when a third current flows through a second switching means, the second switching means connecting the power source to the second circuit based on the third current; and
means for preventing a fourth back feed current from flowing through the second switching means when the neutral line of the power source is open;
wherein the means for preventing a second back feed current and the means for preventing a fourth back feed current prevent any current from flowing in either direction through a continuous portion of the neutral line and through the first switching means and the second switching means due to an open neutral in a supply side of the power source; wherein the second back feed current has a first path from the neutral line to a first hot line of the power source through the first switching means, and wherein the fourth back feed current has a second path from the neutral line to a second hot line of the power source through the second switching means, and wherein the first hot line and the second hot line are out of phase with respect to each other.

16. The open neutral protection circuit of claim 15, wherein the first circuit comprises a first ground fault circuit interrupter (GFCI).

17. The open neutral protection circuit of claim 15, wherein the first circuit comprises a first ground fault circuit interrupter (GFCI) and the second circuit comprises a second GFCI.

18. The open neutral protection circuit of claim 15, wherein the first switching means is arranged to conduct the first current from the first hot line of the power source to the neutral line of the power source, and wherein the second back feed current has the first path from the neutral line to the first hot line through the first switching means, and wherein the second switching means is arranged to conduct the third current from the second hot line of the power source to the neutral line of the power source, and wherein the fourth back feed current has the second path from the neutral line to the second hot line through the second switching means.

\* \* \* \* \*